United States Patent [19]

Saito

[11] Patent Number: 4,920,258

[45] Date of Patent: Apr. 24, 1990

[54] RECORDING APPARATUS WITH CARRIAGE-DRIVING/SHEET-FEEDING MECHANISM

[75] Inventor: Yasuhide Saito, Tokyo, Japan

[73] Assignee: Canon Kabushiki Kaisha, Tokyo, Japan

[21] Appl. No.: 299,343

[22] Filed: Jan. 23, 1989

[30] Foreign Application Priority Data

Jan. 30, 1988 [JP] Japan ................................ 63-20804

[51] Int. Cl.[5] ............................................ G01D 15/24

[52] U.S. Cl. .................................... 346/134; 366/136; 366/76 PH; 400/185

[58] Field of Search .................. 346/76 PH, 134, 136; 400/120, 185

[56] References Cited

U.S. PATENT DOCUMENTS 4,752,786 6/1988 Inoue et al. .................... 346/76 PH

FOREIGN PATENT DOCUMENTS 3243792 9/1983 Fed. Rep. of Germany ...... 400/185
0152884 8/1984 Japan .................................. 400/185
0046669 2/1987 Japan .................................. 400/185

OTHER PUBLICATIONS

Prewarski, "Typewriter Power Module for Indexing and Escapement", IBM Disc. Bulletin, vol. 21, No. 10, 3/79.

*Primary Examiner*—Bruce A. Reynolds
*Assistant Examiner*—Huan Tran
*Attorney, Agent, or Firm*—Fitzpatrick, Cella, Harper & Scinto

[57] ABSTRACT

A recording apparatus comprises a carriage for carrying a printing head capable of recording on a recording sheet, a drive belt secured to the carriage for reciprocating the carriage relative to the recording sheet when the drive belt is driven, a rotatable feed roller for feeding the recording sheet past the printing head when the feed roller is driven, a reversible motor having a rotatable motor shaft, a drive pulley mounted to the motor shaft, wherein the drive belt passes over the drive pulley to reciprocate the carriage when the motor shaft is rotated in different directions, a worm wheel mounted to the feed roller to rotate therewith to feed a recording sheet when the worm wheel is rotated in a predetemined direction, a worm gear mounted to the motor shaft, wherein the worm gear meshes with the worm wheel to rotate it in different directions when the motor shaft is rotated in respective different directions, and a one-way clutch cooperating with the said feed roller and the worm wheel to transmit the rotation of the worm wheel to the feed roller only in the predetermined direction.

6 Claims, 6 Drawing Sheets

RECORDING APPARATUS WITH CARRIAGE-DRIVING/SHEET-FEEDING MECHANISM

BACKGROUND OF THE INVENTION

1. Field of the Invention

This invention relates to a recording apparatus, and more particularly, to a recording apparatus in which a carriage with a recording head on it is reciprocated by a single driving source and, at the same time, recording material is fed to the recording head.

2. Description of the Prior Art

Heretofore in recording apparatus, a single driving motor is rotated in the forward or reverse direction, and such rotation is converted into reciprocating movement of a print head carriage (in a printing direction or return direction) using a transmission mechanism such as a gear, pulley or the like. Then, when printing is complete and recording material (for example, paper) is to be fed, the rotation of the motor is transmitted to a paper-feeding roller using a one-way clutch. Paper feeding is performed by rotating the paper-feeding roller only when the carriage is moving in the return direction. In feeding the paper by one line, the carriage has to travel over the distance corresponding to an entire line, irrespective of the number of characters or columns to be printed. It is difficult to achieve high-speed movement of the carriage because the transmission mechanism becomes complicated. In addition, if it is desired to perform continuous paper feeding without printing, or to print lines with a small number of columns per line, the carriage still has to travel over the distance covering one line. This decreases the paper-feeding speed and printing speed.

In order to solve such problems, there are two mechanisms disclosed in Japanese Patent Provisional Publication No. 57-89982 (1982). In the first, paper is fed by one line using a cam to limit the driving range of the paper-feeding roller, without requiring the carriage to reciprocate over the distance covering a whole line. In the second, paper is fed by one line even when the carriage is returned from an arbitrary printed column, by using a conventional spring clutch and a simple transmission mechanism, without requiring electric control means such as an electromagnetic clutch, an electromagnet or the like.

This first conventional approach will be explained in more detail with reference to FIGS. 1 A, 1 B and 1 C. These figures show a bubble-jet recording apparatus for performing serial recording. In these figures, there are shown a frame 1 and a recording head 2 for recording by discharging ink using the bubble-jet method. A carriage 3 carries the recording head 2, and is reciprocated along a guide shaft 4. Both ends of a wire are fixed to the carriage 3, and the wire 5 is stretched between pulleys 6. A stepping motor 7 can drive the wire 5 via a gear 7A to reciprocate the carriage 3.

A shaft-type cam 8 has a continuous guide projection 8A, as shown in FIG. 2, which is fitted in a groove (not illustrated) in the carriage 3. Further, a clutch spring 9 and a clutch gear 10, one end of which is anchored to and co-operates with the clutch spring 9, are fitted in the home-position end of the cam 8 (designated H in FIG. 2). In these figures, when the cam 8 is rotated clockwise, the clutch gear 10 and the cam 8 are engaged via the clutch spring 9, and it is possible to rotate the clutch gear 10 clockwise. When the cam 8 is rotated counterclockwise, the clutch spring 9 does not engage with the cam 8, and the clutch gear 10 is not rotated.

Now, in FIG. 1 B, when the carriage 3 is moved backward from left to right, that is, toward the home position H, it first reaches the position G shown in FIG. 2. The cam 8 will thereafter start rotating clockwise in accordance with the shape of the guide projection 8A, and this movement continues until the carriage 3 reaches the home position H. During that time, the clutch gear 10 is also rotated clockwise. The clutch gear 10 is configured, as shown in FIG. 1 B, so as to drive a sheet-feeding gear 12 via an idle gear 11. The clutch gear 10 thus rotates a paper-feeding roller (not illustrated), and it is possible to feed a recording sheet which is held between the feeding roller and a pinch roller 13.

During forward movement of the carriage away from homeposition H, recording is performed by the recording head 2 and the cam 8 is rotated counterclockwise as the carriage moves from position H to position G. However, as described above, the clutch gear 10 is not rotated, and hence the paper-feeding roller is not driven.

By such a recording apparatus, when the stepping motor 7 is switched on and the carriage 3 is at the home position H, the carriage 3 is moved to the left by the motor 7 and, in synchronization with the carriage movement, ink-discharge signals are selectively supplied to the recording head 2 via a flexible cable 14, and thus recording is performed. When recording for one carriage scanning is completed, the carriage 3 is returned to the home position by reverse rotation of the stepping motor 7. When the carriage 3 returns to a predetermined position (as described above, the position G of the cam 8), the clutch gear 10 starts rotating, drives the feeding roller, and thus sheet feeding is performed. When continuous, rapid printing feeding is required without sheet, it can be achieved by reciprocating the carriage 3 between the positions G and H shown in FIG. 2. Further, when the number of columns to be recorded is small, it is possible to perform sheet feeding by returning the carriage 3 from the position of the last printed column toward the right.

In this conventional recording apparatus, however, the load on the stepping motor is increased when the paperfeeding roller is driven by the cam 8, and the torque characteristic of the motor at that range should be large. This results in a complicated control. Moreover, when the paper-feeding roller is driven by the cam 8, especially if the gear 10 is provided with a ratchet, violent vibration and noise can occur. Further, since the number of components in this arrangement is large, there are reliability problems. Thus, this conventional apparatus has many problems to be solved.

Another approach is disclosed by Japanese Patent Provisional Publication No. 59-145175 (1984). The rotation of a motor is converted into movement of a carriage by means of a lead screw or the like. When the carriage is located outside the printing range, the rotation of a cam member is transmitted to a paper-feeding roller via a clutch provided at an end portion of the cam member. However, this approach also requires a complicated configuration, and has the same problems as those described above.

This second conventional approach will be explained in more detail with reference to FIGS. 3 and 4.

FIG. 3 shows a driving motor 21, such as a pulse motor or the like, connected to a carriage-driving shaft 25 via gears 22, 23 and 24. The carriage-driving shaft 25 is rotatable in both forward and reverse directions in accordance with the rotation of the motor. A carriage 27 is slidably supported along the carriage-driving shaft 25. A printing head 26 is fixed to the carriage 27, and a worm gear 28 is attached to the carriage 27. The worm gear 28 is secured to and rotated by the carriage-driving shaft 25.

Consequently, when the carriage-driving shaft 25 is rotated counterclockwise (viewing FIG. 3 from the right), the worm gear 28 is also rotated counterclockwise. By the meshing between the worm gear 28 and a rack gear 31, the carriage 27 and, accordingly, the printing head 26, are moved in to the right, that is, in the printing direction, along the carriage-driving shaft 25. At the same time printing is performed by the printing head 26.

Further, the above-described carriage-driving shaft 25 is connected to a paper-feeding driving shaft 35 via gears 32, 33 and 34, so that the paper-feeding driving shaft 35 is also rotated counterclockwise with the shaft. Counterclockwise rotation of the paper-feeding driving shaft 35 also rotates a boss 36, and a friction plate 41, counterclockwise. Hence, a projection 30 is moved counterclockwise, and with that movement a lever 29 is rotated clockwise, and a claw on the lever 39 is disconnected from a clutch cam 38. In this case, when the boss is rotated counterclockwise (viewing FIG. 4 from the right), such rotation is not transmitted to a cam gear 39, or to a paper-feeding roller 40, since this rotation is in a direction that loosens a spring 37 from around the boss 36.

Then, when one line of printing is completed, rotation of the carriage-driving shaft 25 is reversed, and the printing head 26 returns to the left, that is, in the reverse direction. By the reverse rotation of the carriage-driving shaft 25, the paper-feeding driving shaft 35 starts rotating clockwise (viewing FIG. 3 from the right). This rotates the boss 36 and the friction plate 41 in a clockwise direction. However, since the claw of the lever 29 is disconnected when the projection 30 starts moving, the clutch cam 38 can be rotated clockwise. On the other hand, when the boss 36 is rotated clockwise, the spring 37 is clamped to the outer circumference of the boss, and torque is transmitted to the cam gear 39 to perform paper feeding.

Further, when the paper-feeding driving shaft 35 continues rotating clockwise (viewing FIG. 3 from the right), the projection 30 is moved to the end of its rotation in the clockwise direction. Hence, the claw of the lever 29 also returns to an engaging position with the clutch cam 38. When the clutch cam 38, which thus rotates practically as one body with the cam gear 39, completes one revolution, further rotation is prevented by the claw of the lever 29. When a force in the counterclockwise direction (viewing FIG. 4 from the right) is applied to the clutch cam 38, the spring 37 is loosened around the boss 36. Hence, the rotation of the boss 36, and the paper-feeding driving shaft 35, is no longer transmitted to the cam gear 39.

Thus, paper feeding can be performed by transmitting only the first reverse revolution of the paper-feeding driving shaft 35 to the cam gear 39 and the paper-feeding roller 40, when the printing head 26 is shifted from traveling in the printing direction to the return direction. When paper feeding is performed, by the rotation of the paper-feeding roller 40, a lever 42 is rotated counterclockwise by the action of the cam gear 39, and a platen 43 is separated from the printing head 26, so that paper feeding is smoothly performed.

In this second conventional apparatus, however, there are problems in that the apparatus is large and higher in cost.

SUMMARY OF THE INVENTION

The present invention is directed to a solution of the above-described problems.

It is an object of the present invention to provide a recording apparatus in which both carriage driving and paper feeding are performed by a single driving source with an extremely simple configuration.

It is another object of the present invention to provide a recording apparatus in which, when carriage driving and paper feeding are performed by a single driving source, the driving system is made light in weight with a simple configuration, the load is dispersed and high-speed operation is performed.

In accordance with one aspect of the present invention, a recording apparatus comprises a carriage for carrying a printing head capable of recording on a recording sheet, a drive member secured to the carriage for reciprocating the carriage relative to the recording sheet when the drive member is driven, a feed mechanism for feeding the recording sheet past the printing head when the feed mechanism is driven in a predetermined direction, reversible motive means having a rotatable output member for driving the drive member and the feed mechanism, a first transmission unit, mounted to the output member to rotated therewith, for transmitting rotation of the output member to the drive member to reciprocate the carriage in different directions as the output member rotates in respective different directions, a second transmission unit, mounted to the output member to rotate therewith, for transmitting rotation of the output member to the feed mechanism to feed a recording sheet, and clutch means for transmitting rotation of the output member to the feed mechanism only in the predetermined direction.

These and further other objects and aspects of the present invention will be apparent from the following description of the preferred embodiments.

BRIEF DESCRIPTION OF THE DRAWINGS

FIG. 1 B is a front view of the apparatus shown in FIG. 1 A.

FIG. 1 C is a bottom view of the apparatus shown in FIG. 1 A.

DESCRIPTION OF THE PREFERRED EMBODIMENTS

Embodiments of the present invention will be hereinafter explained in detail and concretely with reference to the drawings.

Figure 5:
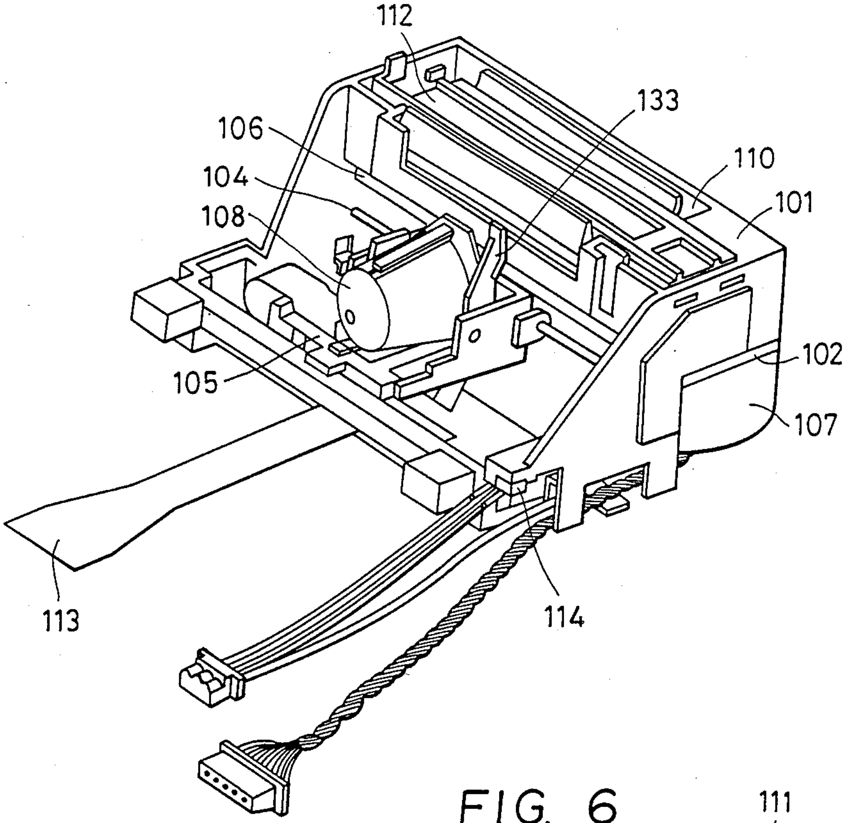
FIG. 5 is a perspective view of a recording apparatus showing an embodiment of the present invention.

First, the total configuration of an embodiment of the invention will be explained with reference to FIGS. 5 and 6. In FIGS. 5 and 5, there is shown a frame 101 which provides support for the recording apparatus. A base 102 fixed to the frame 101 supports a reversible stepping motor 107 and a pinch roller 103, shown in FIG. 6 and described in more detail later. A guide shaft 104, the both ends of which are fixed to the frame 101, movably guides a carriage 105. There is also shown a timing belt 106, a part of which is bound in the carriage 105, and which is driven by a stepping motor 107. The timing belt 106 will be described in detail later. The timing belt 106 can move the carriage 105 as well as a recording or printing head 108 carried by the carriage 105, and recording is performed by discharging ink from the recording head 108. The recording head 108 is removable from the carriage 105 by a set lever 133, and ink is filled within the recording head 108. The recording head 108 is of the disposable type, that is, it is exchanged for a new one when the ink is used up.

Figure 6:
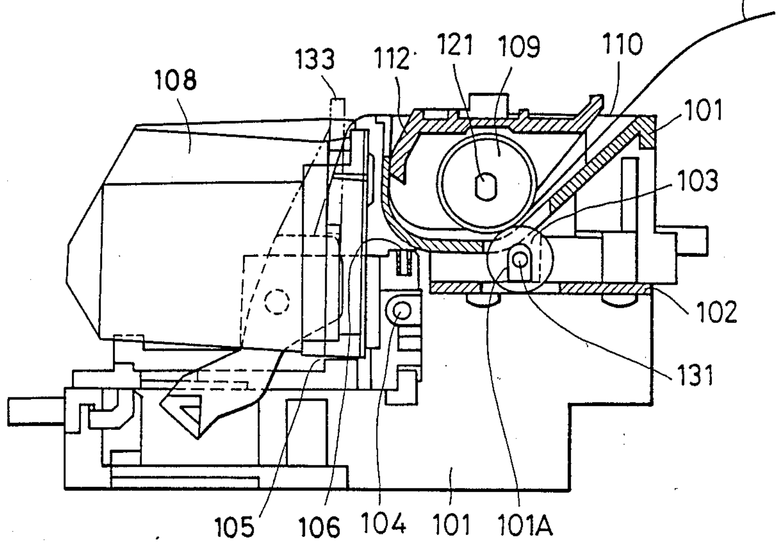
FIG. 6 is a side view partly in section of the apparatus shown in FIG. 5.

A feeding roller 109 feeds a recording sheet 111, inserted from an inlet 110 as shown in FIG. 6, past the recording position at the recording head. A non-slip elastic body is mounted on the surface of the feeding roller 109. The feeding roller 109 is, in the present embodiment, driven by the stepping motor 107 to feed a recording sheet past the recording position, as described later, and it can hold the recording sheet 111 between itself and the pinch roller 104, to feed the recording sheet through and out of the apparatus. A platen 112 holds the recording sheet 111 at the recording position. A flexible cable 113 supplies recording signals to the recording head 108 mounted on the carriage. A home-position sensor 114 detects the carriage 105 when it reaches the home position.

Next, the system by which the timing belt 106 is driven by the stepping motor 107 and the system by which the feeding roller 109 is driven will be explained with reference to FIGS. 7 through 9.

Figure 7:
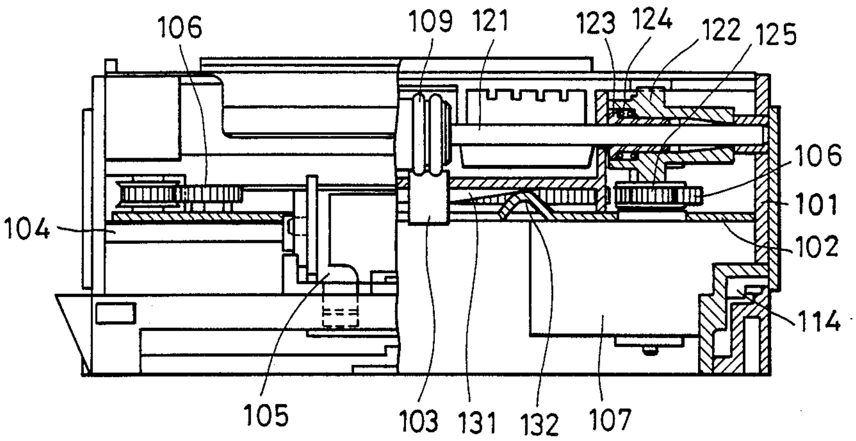
FIG. 7 is a front view, partly in section, of the apparatus shown in FIG. 5.
Figure 8:
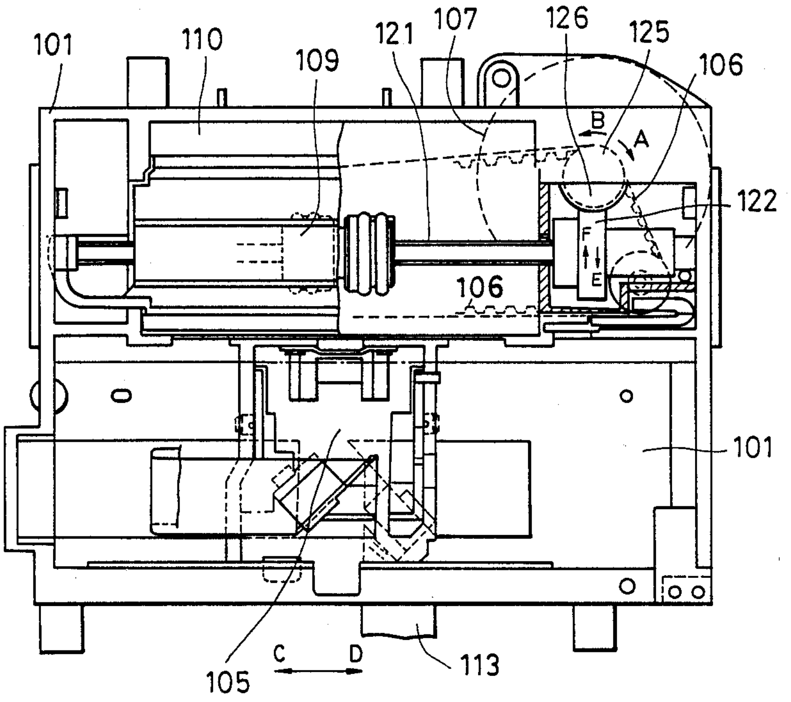
FIG. 8 is a plan view of the apparatus shown in FIG. 5.
Figure 9:
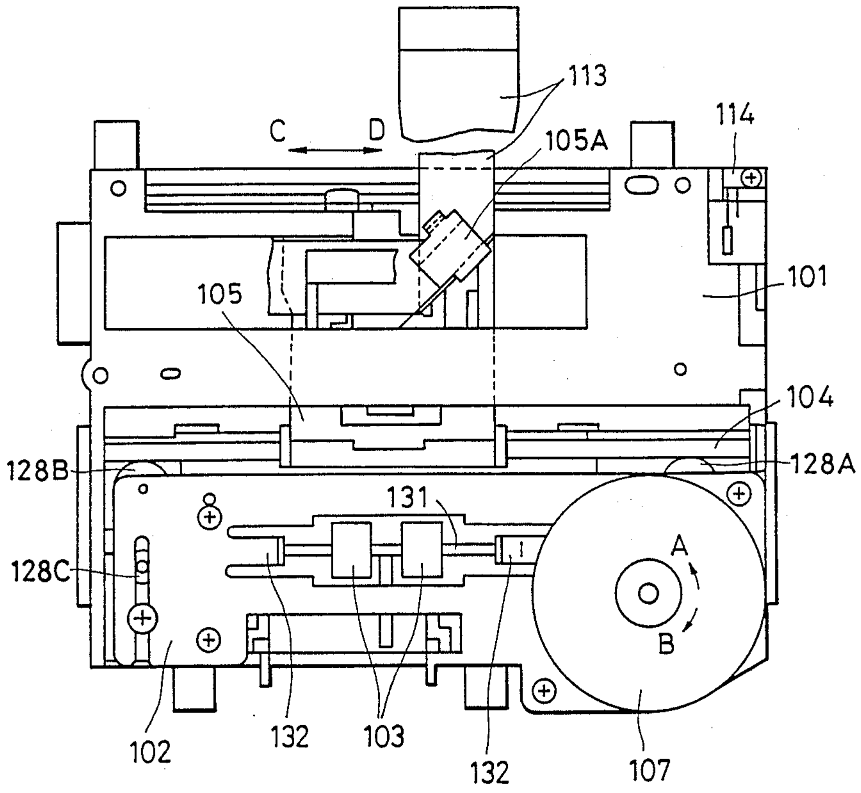
FIG. 9 is a bottom view of the apparatus shown in FIG. 5.

In FIGS. 7 and 8, in which the recording head 108 is omitted, there are shown a feeding-roller shaft 121, and a worm wheel 122 which is fitted with the feeding-roller shaft 121 and which can rotate the feeding-roller shaft 121 only in one direction. That is, as shown in FIG. 7, there are an arbor 123 fitted and fixed to the roller shaft 121, and a spring clutch 124 interposed between the arbor 123 and the worm wheel 122. One end of the spring of the spring clutch 124 is anchored in a groove (not illustrated) in the worm wheel 122, so that it is rotated as a body with the worm wheel 122. Now, when the apparatus is recording, the worm wheel 122 is rotated in the direction E shown in FIG. 8 by the stepping motor 107, and the spring of the spring clutch 124 is not engaged with the arbor 123; hence, the feeding roller 109 and its shaft 121 are maintained in a nonrotating state. Only when the worm wheel 122 is rotated in the direction F (for sheet feeding), is the spring of the clutch 124 engaged with the arbor 123, so that the feeding roller 109 and feeding-the roller shaft 121 can be rotated in that direction.

Figure 10:
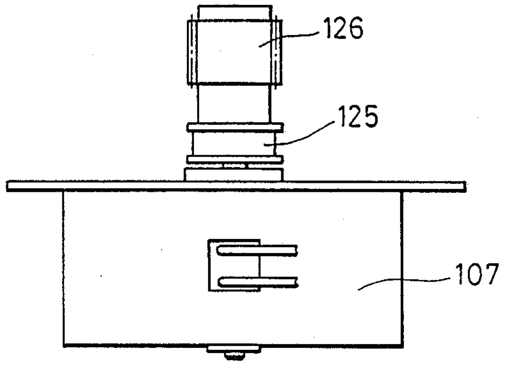
FIG. 10 is a side view of the stepping motor and the driving system thereof shown in FIG. 5.

As shown in FIG. 7, a belt-driving pulley 125 is rotated by the stepping motor 107, and drives the timing belt 106. As shown in FIG. 8, a worm gear 126, which is also rotated by the stepping motor 107, meshes with the worm wheel 122. The belt-driving pulley 125 and the worm gear 126 are provided as a single unit, as shown in FIG. 10, and are mounted to the shaft or output member of the stepping motor 107. Consequently, the belt-driving pulley 125 and the worm gear 126 can be simultaneously driven by the stepping motor 107. As shown in FIG. 8, the timing belt 106 is also supported by idler pulleys 128A, 128B and 128C, as well as by the pulley 125.

Next, the configuration relative to the pinch roller 103 will be explained with reference to FIGS. 6, 7 and 9. In these figures, a pinch-roller shaft 131 is formed by a conductive material together with the pinch roller 103. As shown in FIG. 6, ends of the pinch-roller shaft 131 are held in a guide groove 101A of the frame 101. FIG. 7 illustrates that between the ends of the pinch-roller shaft 131 and the pinch roller 103, the shaft 131 is biased by a spring member 132, which is formed of a conductive material and is projected from the chassis 102 toward the feeding-roller shaft 121 and the feeding roller 109.

Next, the operation of the recording apparatus will be explained.

Before starting recording, a corner member 105A of the carriage 105 shown in FIG. 8 contacts the home-position sensor 114. The carriage stops when detected in that position by the sensor 114. When driving signals for scanning the carriage 105 relative to the recording sheet are supplied to the stepping motor 107 for recording, the shaft or output member of the motor 107 starts rotating in the direction of the arrow A and rotates the belt-driving pulley 125 together with the worm gear 126. The worm wheel 122 is thus rotated in the direction E by the worm gear 126. The spring clutch 124 shown in FIG. 7 releases the arbor 123, as described above, and the feeding-roller shaft 121 fitted with the arbor 123 is not rotated. Hence, a sheet-feeding operation by the feeding roller 109 is not performed.

Thus, by the rotation of the belt-driving pulley 125 in the direction A shown in FIG. 8, the carriage 105 is moved in the direction of the arrow C. At the same time, in synchronization with the driving signals to the motor 107, ink-discharging signals are selectively supplied to the recording head 108 via the flexible cable 113, and ink from the inside of the recording head 108 is discharged from the recording head 108 to perform recording.

When recording is completed, the carriage 105 is moved toward the home position 114, that is, in the direction D, by reverse rotation of the stepping motor 107 shaft, that is, in the direction B. By rotation of the worm gear 126 and the belt-driving pulley 125 in the same direction, the worm wheel 122 is rotated in the direction F. When the worm wheel 122 is rotated in the direction F, the spring clutch 124 shown in FIG. 3 rotates the feeding-roller shaft 121 in the same direction, that is, in the direction F, gripping the arbor 123, to perform sheet feeding by the feeding roller 109. That is, it is possible to feed the sheet during return of the carriage 105, while recording is not being performed.

In the present embodiment, the sheet feeding amount is determined by the amount of rotation (the angle of rotation) of the stepping motor 107 when the carriage 105 is returned. It will be appreciated that even when an entire line is not recorded, it is necessary always to move the carriage 105 all the way to the left (as viewed in FIG. 5), so that sheet feeding will be performed during the whole stroke of the return movement of the carriage 105. However, a complicated control, one that changes the angle or rotation of the stepping motor in accordance with the number of columns to be recorded, or the like, as in prior apparatus, becomes unnecessary with the present invention.

As described above, according to the present invention, a rotating output member, on which a first transmitting unit (driving pulley 125) and a second transmitting unit (worm gear 126) rotate as a unit with the rotating output member. The motive power of the output member is transmitted to a carriage-moving mechanism via the first transmitting unit to reciprocate the carriage, and to a sheet-feeding mechanism via the second transmitting unit. A clutch provides for rotation of the sheet-feeding mechanism in only one direction. Hence, it is possible to reduce the number of components in the sheet-feeding mechanism and the carriagemoving mechanism and the cost of the apparatus, to provide a light-weight apparatus with an extremely simple configuration, and to prevent vibration in the direction of the shaft and the accompanying generation of noise that occur in conventional apparatus. Furthermore, the load applied to the driving source during sheet feeding can be distributed, so that motor control becomes easier and it is possible to record at high speeds.

What is claimed is:

1. A recording apparatus comprising:
   a carriage for carrying a printing head capable of recording on a recording sheet;
   a drive member secured to said carriage for reciprocating said carriage relative to the recording sheet when said drive member is driven;
   a feed mechanism for feeding the recording sheet past the printing head when said feed mechanism is driven in a predetermined direction;
   reversible motive means having a rotatable output member for driving said member and said feed mechanism;
   a first transmission unit, mounted to said output member to rotate therewith, for transmitting rotation of said output member to said drive member to reciprocate said carriage in different directions as said output member rotates in respective different directions;
   a second transmission unit, mounted to said output member to rotate therewith, for transmitting rotation of said output member to said feed mechanism to feed a recording sheet; and
   clutch means for transmitting rotation of said output member to said feed mechanism only in the predetermined direction.

2. A recording apparatus comprising:
   a carriage for carrying a printing head capable of recording on a recording sheet;
   a drive belt secured to said carriage for reciprocating said carriage relative to the recording sheet when said drive belt is driven;
   a rotatable feed roller for feeding the recording sheet past the printing head when said feed roller is driven;
   a reversible motor having a rotatable motor shaft for driving said drive belt and said feed roller;
   a drive pulley mounted to said motor shaft to rotate therewith, wherein said drive belt passes over said drive pulley to reciprocate said carriage in different directions when said motor shaft is rotated in respective different directions;
   a worm wheel mounted to said feed roller to rotate therewith to feed a recording sheet when said worm wheel is rotated in a predetermined direction;
   a worm gear mounted to said motor shaft to rotate therewith, wherein said worm gear meshes with said worm wheel to rotate said worm wheel in different directions when said motor shaft is rotated in respective different directions; and
   a one-way clutch cooperating with said feed roller and said worm wheel to transmit the rotation of said worm wheel to said feed roller only in the predetermined direction.

3. A recording apparatus according to claim 2, wherein said one-way clutch comprises a coil spring disposed in a radial space between said worm wheel and a shaft attached to said feed-roller.

4. A recording apparatus according to claim 2, wherein:
   the printing head records on the recording sheet during movement of said carriage in a first direction away from a home position and does not record during movement of said carriage in a second direction toward the home position; and
   said clutch causes rotation of said feed roller only during movement of said carriage in the second direction.

5. A recording apparatus according to claim 2, wherein said drive pulley and said worm gear are disposed proximate each other on said motor shaft.

6. A recording apparatus according to claim 5, wherein said drive puley and said worm gear comprise a unitary structure.

* * * * *

UNITED STATES PATENT AND TRADEMARK OFFICE

CERTIFICATE OF CORRECTION

PATENT NO. : 4,920,258

DATED : April 24, 1990

INVENTOR(S) : YASUHIDE SAITO

It is certified that error appears in the above-identified patent and that said Letters Patent is hereby corrected as shown below:

COLUMN 2

Line 17, "homeposition H," should read --home position H,--.
Line 35, "printing feeding" should read --sheet feeding--.
Line 36, "sheet," should read --printing,--.
Line 44, "paperfeeding roller" should read --paper-feeding roller--.

COLUMN 3

Line 13, "in" (first occurrence) should be deleted.
Line 25, "lever 39" should read --lever 29--.

COLUMN 4

Line 31, "rotated" should read --rotate--.

COLUMN 5

Line 11, "FIGS. 5 and 5," should read --FIGS. 5 and 6,--.
Line 37, "pinch roller 104," should read --pinch roller 103,--.
Line 67, "feeding-the roller shaft 121" should read --the feeding-roller shaft 121--.

COLUMN 6

Figure 1A:
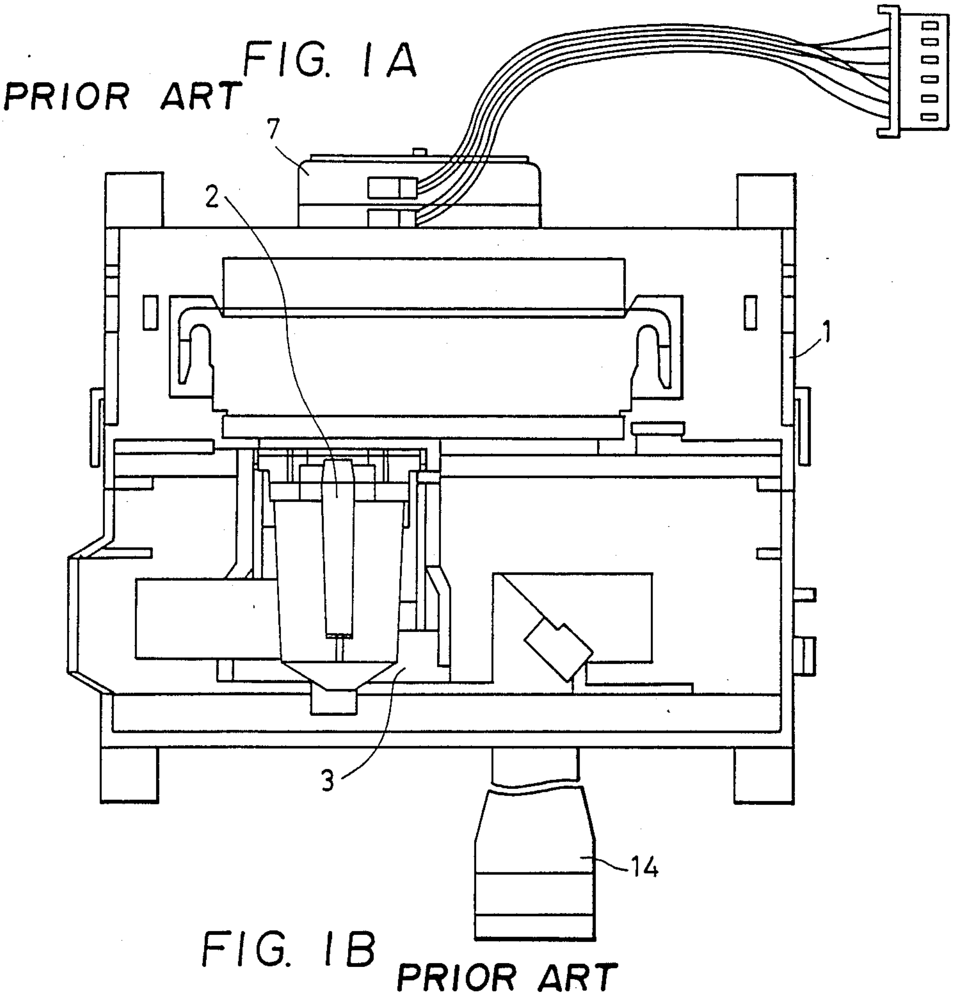
FIG. 1A PRIOR ART
FIG. 1 A is a top plan view of a first conventional recording apparatus.
Figure 1B:
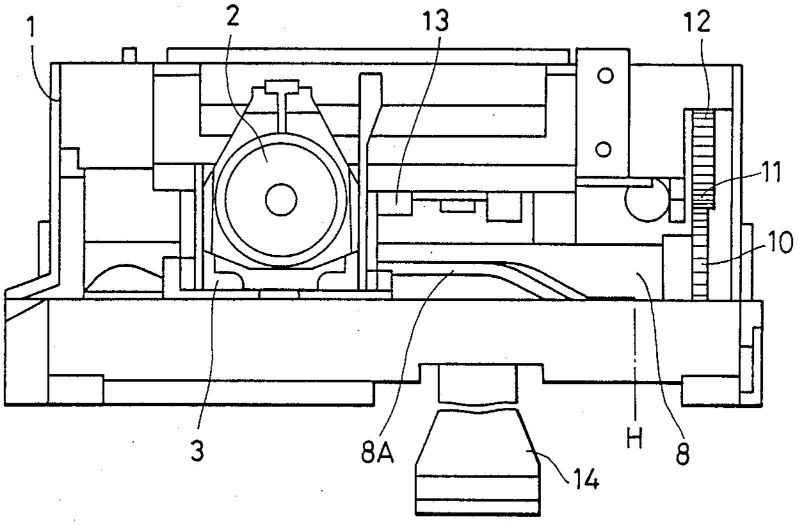
FIG. 1B PRIOR ART
Figure 1C:
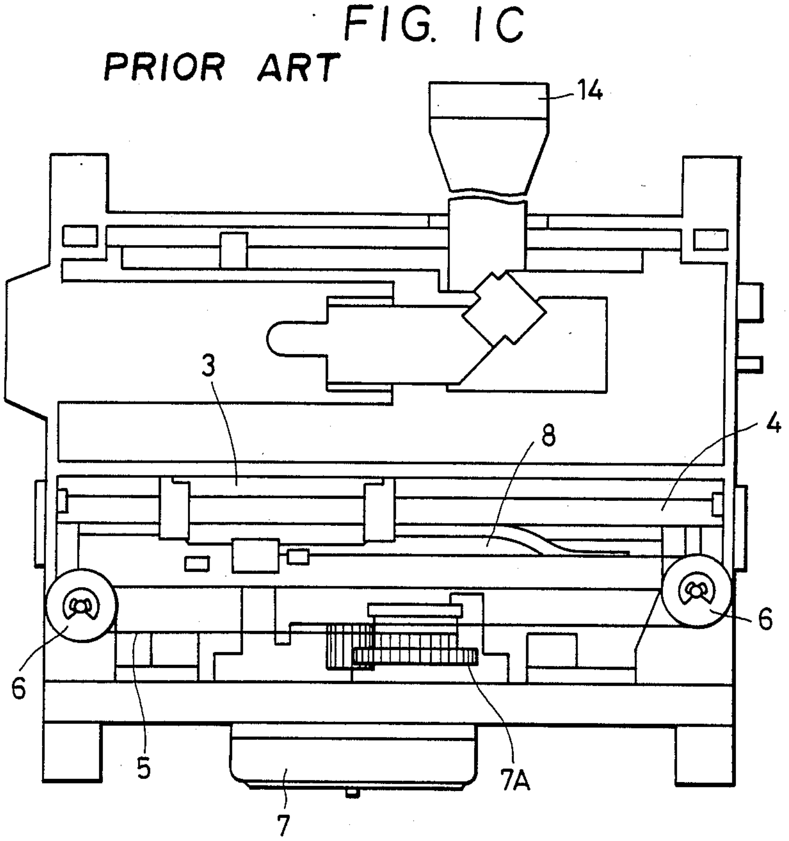
FIG. 1C PRIOR ART
Figure 2:
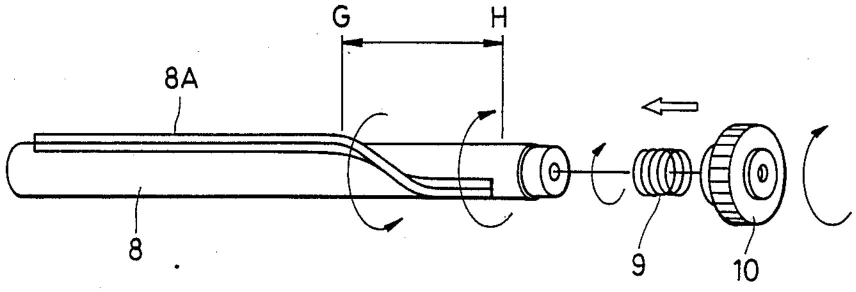
FIG. 2 PRIOR ART
FIG. 2 is an exploded view of the cam shown in FIG. 1.
Figure 3:
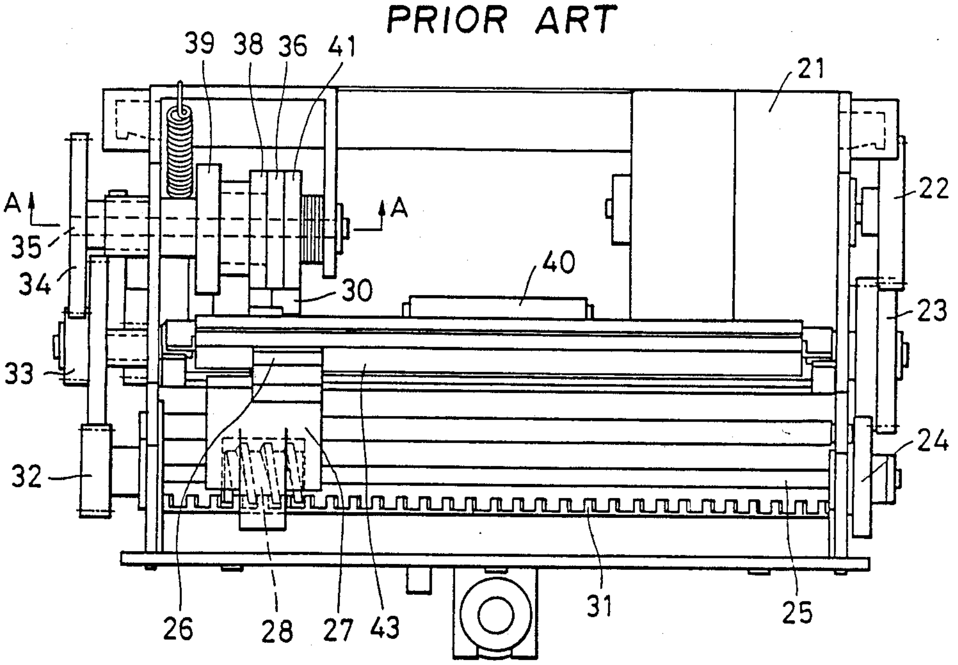
FIG. 3 PRIOR ART
FIG. 3 is a configurational diagram of a second conventional recording apparatus.
Figure 4:
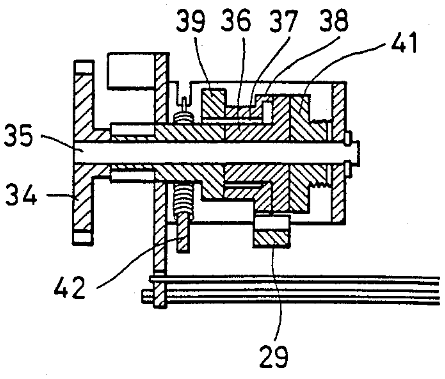
FIG. 4 PRIOR ART
FIG. 4 is a cross-sectional view taken on line A—A in FIG. 3.

Line 59, "FIG. 3" should read --FIG. 7--.

UNITED STATES PATENT AND TRADEMARK OFFICE
CERTIFICATE OF CORRECTION

PATENT NO. : 4,920,258

DATED : April 24, 1990

INVENTOR(S) : YASUHIDE SAITO

It is certified that error appears in the above-identified patent and that said Letters Patent is hereby corrected as shown below:

COLUMN 7

Line 6, "or rotation" should read --of rotation--.
Line 21, "carriagemoving" should read --carriage-moving--.

COLUMN 8

Line 36, "feed-roller." should read --feed roller.--
Line 51, "drive puley" should read --drive pulley--.

Signed and Sealed this

Seventh Day of April, 1992

*Attest:*

HARRY F. MANBECK, JR.

*Attesting Officer*

*Commissioner of Patents and Trademarks*